Dec. 15, 1942.    A. W. FLEER ET AL    2,305,248
PROCESS FOR RECOVERY OF ANTIMONY TRICHLORIDE
Filed Nov. 25, 1941
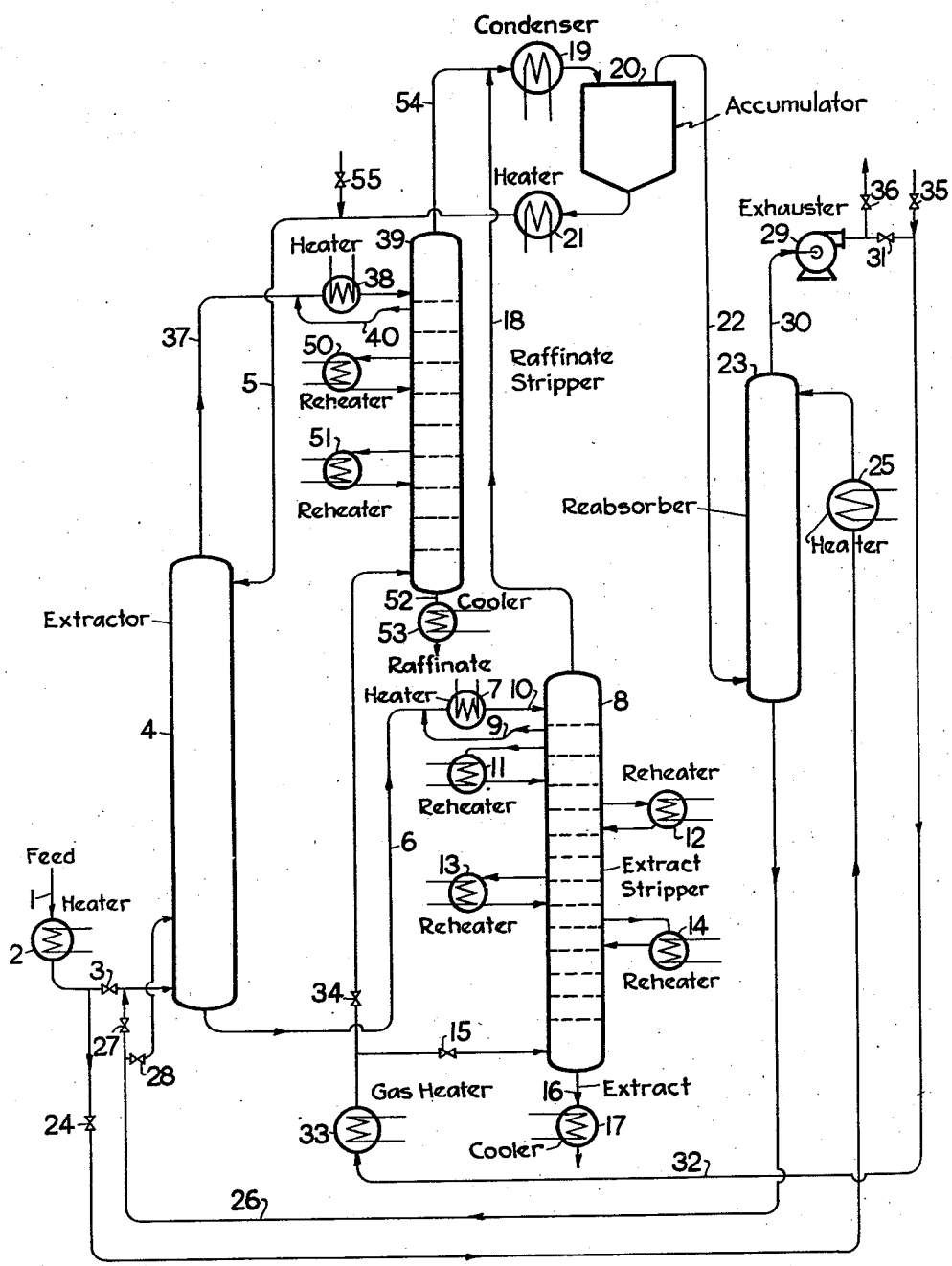
Inventors: Alfred W. Fleer
Russell W. Millar
By their Attorney:

UNITED STATES PATENT OFFICE 2,305,248

PROCESS FOR THE RECOVERY OF ANTIMONY TRICHLORIDE

Alfred W. Fleer, San Francisco, and Russell W. Millar, Berkeley, Calif., assignors to Shell Development Company, San Francisco, Calif., a corporation of Delaware Application November 25, 1941, Serial No. 420,386

15 Claims. (Cl. 196—13)

The present invention relates to a process for treating hydrocarbons and other materials with antimony trichloride, and to the recovery of antimony trichloride from mixtures resulting from the treatment therewith. More particularly it relates to a process for removing and recovering antimony trichloride from extracts and/or raffinates derived from treatment with antimony trichloride of materials such as hydrocarbons, etc., which are derived from petroleum, coal tar, synthetic or other sources, or from products arising in catalytic processes wherein antimony trichloride is employed as the catalyst.

Antimony trichloride has been found to be a useful agent for treating organic materials, in particular hydrocarbon materials and certain other materials which are relatively inert toward antimony trichloride, e. g., essential oils, fatty oils, fatty acids, etc. Depending upon the conditions under which it is employed, it may act as a selective solvent for aromatic hydrocarbons in particular, or substituted aromatic hydrocarbons such as phenols, etc.; or as a polymerizing or alkylating agent for olefinic hydrocarbons, or as Friedel-Crafts catalyst, etc. Its use for treating hydrocarbons in the liquid phase, such as lubricating oils and the like, has been described in co-pending U. S. patent application, Serial No. 305,426, filed December 9, 1939. Polymerization with antimony trichloride is described, for example, in U. S. Patent 2,085,535.

The reactivity of antimony trichloride at elevated temperatures makes it difficult to remove and recover from relatively high boiling hydrocarbon materials without converting it into compounds useless for further employment in certain processes. Nonetheless, any successful process for its use on a commercial scale must be predicated upon the efficient recovery of unreacted portions of antimony trichloride for use in further cycles because of its relatively high cost. Also, it is desirable that even small amounts of residual antimony trichloride be removed from treated hydrocarbons because of the poisonous nature of antimony compounds and their tendency to catalyze decomposition reactions in the treated materials when appreciable quantities remain therein.

It is an object of our invention to provide an efficient process for the removal and recovery of antimony trichloride from relatively high boiling treated materials, especially hydrocarbons. It is a further object of our invention to provide a process for the removal and recovery of antimony trichloride from lubricating oil extracts and/or raffinates, which process is economical and adapted to applications on a commercial scale. Further objects of our invention will be apparent from the present specification.

Our invention comprises treating an initial organic material with antimony trichloride under conditions to produce a solution of antimony trichloride in a relatively high boiling resulting product substantially stable toward antimony trichloride under the conditions of our process, and recovering the antimony trichloride therefrom by stripping the solution with an inert normally gaseous stripping medium to vaporize the antimony trichloride and to leave behind the product substantially free from antimony trichloride, condensing out part of the antimony trichloride from the resulting vapor-gas mixture, and then re-absorbing remaining uncondensed antimony trichloride from the residual gas by contact with liquid initial organic material which is subsequently treated with further quantities of the antimony trichloride. The resulting residual lean gas may be used for stripping in another cycle.

It is essential for the proper operation of our process that water be excluded from the system, otherwise antimony trichloride will react with the water to give products of hydrolysis, causing losses as well as corrosion and other difficulties. It is highly desirable that at no time the temperature at any place in the system be allowed to exceed 200° C., and preferably 170° C., because at high temperatures antimony trichloride reacts with aromatic hydrocarbons. As already indicated, usually higher temperatures can be tolerated in stripping raffinates than extracts, owing to higher concentration of aromatic hydrocarbons in the latter. For example, we have found that decomposition is negligible when a lubricating oil extract phase is stripped at 125° C. and the corresponding raffinate at 150° C.

Our invention may be better understood from the accompanying drawing. The figure is a flow diagram illustrating one embodiment of our invention wherein a lubricating oil is extracted with antimony trichloride in the liquid phase.

Lubricating oil stock is admitted via line 1 to heater 2 and passes through control valve 3 to the bottom of extractor 4 wherein, at a temperature preferably between about 73° C. and 125° C., it countercurrently contacts liquid antimony trichloride admitted to extractor 4 through line 5. Herein two phases are formed, an extract phase and a raffinate phase.

The extract phase is passed via line 6 to heater 7. Herein it is heated while in contact with methane saturated with antimony trichloride vapor fed from the extract stripper 8 through line 9. The resulting heated extract passes to the top of stripper 8 through line 10 at a temperature of about 125° C.

Further heat for vaporizing antimony trichloride is provided in extract stripper 8 by the series of reheaters 11, 12, 13 and 14, arranged along the column in such a manner that antimony trichloride-extract liquid is withdrawn from a tray at about 100° C. and passes to the corresponding heater, wherein it is reheated to a temperature of approximately 125° C., and passes back from the reheater to the tray below that from which it was withdrawn. A series of heaters is preferable to a single reboiler in the stripper because such a system conveniently allows the necessary heat for stripping to be distributed to the phase treated without the danger of exceeding the maximum permissible temperature to avoid decomposition. Heated methane at a temperature of about 125° C. is admitted to the bottom of stripper 8 through valved line 15. The heat input and flow of methane are adjusted to strip the antimony trichloride from the extract. Extract substantially free from antimony trichloride is withdrawn through line 16, passing to cooler 17, thence to storage not shown.

The methane and antimony trichloride vapor stripped from the extract pass overhead through line 18 to condenser 19 wherein antimony trichloride is condensed and the resulting condensate passes, together with uncondensed methane containing residual antimony trichloride vapors, to accumulator 20. Herein residual gas is separated from the condensed antimony trichloride, the latter being maintained in the liquid phase, for example by controlling the temperature of condenser 19 so as to result in a condensation temperature slightly above the melting point of antimony trichloride, e. g., above 73° C. and preferably below 125° C.

The antimony trichloride thus recovered is returned to extractor 4 via heater 21 and line 5 to contact further quantities of feed in another cycle. Heater 20 may be bypassed if desired, it being employed only when it is desired to maintain the contact temperature in extractor 4 at some temperature substantially in excess of the condensation temperature.

Owing to the relatively high vapor pressure of antimony trichloride at temperatures at which it is liquid, the residual gas, being in equilibrium with the liquid antimony trichloride in accumulator 20, contains appreciable quantities of antimony trichloride which are recovered and utilized as follows: the residual gas containing antimony trichloride from accumulator 20 is passed via line 22 to the bottom of re-absorber 23, wherein the gas containing antimony trichloride is countercurrently contacted and extracted by means of at least a part of the feed stock, which is by-passed from line 3 through valved line 24 and heater 25 (valve 3 being properly regulated). Heater 25 heats the feed to a temperature high enough to reduce its viscosity so that it can be efficiently utilized to absorb the antimony trichloride from the gas in re-absorber 23. The primary concern in heater 25 is to reduce the viscosity of the oil to a suitable value. However, it is desirable to maintain the temperature and pressure in re-absorber 23, provided a suitable viscosity is attained such that the equilibrium relationship between antimony trichloride, inert gas and lubricating oil is favorable to absorption of antimony trichloride in the oil. It is desirable that substantially all of the antimony trichloride be removed from the residual gas by absorption in the oil in order to prevent loss of antimony trichloride to the extract or raffinate phase during contact therewith in subsequent cycles.

The resulting feed, now containing the major portion of the antimony trichloride which had been in the residual gas passes from the bottom of re-absorber 23 via line 26 back to extractor 4. If desired, all or a portion of this feed may join the feed from heater 2 and valve 3 by adjusting valves 27 and 28 appropriately; or, if desired, valve 27 may be closed and all of this oil passed back to extractor 4 via valved line 28 at a point above the point of entrance of the portion of the feed entering this valve. The pressure in re-absorber 23 is maintained preferably at a value below atmospheric, for example in the range of 20–100 mm. Although superatmospheric pressure may be used, we have found operation of the entire fractionating system, including the strippers 8 and 39, accumulator 20, absorber 23, etc., to be most economical at reduced pressures because it permits satisfactory stripping at the maximum allowable temperatures with a minimum amount of gas. This degree of vacuum is conveniently maintained by exhauster 29 which withdraws the methane substantially free from antimony trichloride through line 30, and recirculates it back via valved line 31, line 32 and gas heater 33 to strip further quantities of antimony trichloride from extract in stripper 8, and through valved line 34 to raffinate stripper 39. It is best to place the exhauster as shown in order to avoid the necessity of its handling corrosive antimony trichloride vapors, as would be necessary if placed in line 22.

If desired, the methane may not be recirculated but may be employed in a single cycle. In this case fresh methane is admitted through line 35, valve 31 being closed, and passes through the system as described, leaving the system through valve 36. If refinery light hydrocarbon vapors are used as a stripping medium, they are sometimes available at high pressure and may be used in a once-through operation wherein they are flushed through the strippers and leave the system without the aid of the exhauster, to be used as fuel, etc.

The raffinate from the top of extractor 4 receives a treatment similar to that of the extract as described above, passing through line 37 to heater 38, wherein it is heated in the presence of methane saturated with antimony trichloride admitted from raffinate stripper 39 through line 40. Additional vaporizing heat is supplied by reheaters 50 and 51. However, in this case it is usually permissible to maintain the raffinate stripper at a higher temperature, usually at least 150° C., owing to the fact that fewer aromatics are present (which, at elevated temperatures, would tend to react with antimony trichloride in the extract stripper). Raffinate substantially free from antimony trichloride is withdrawn through line 52 and cooler 53 to storage not shown, while overhead methane containing antimony trichloride passes from column 39 via line 54 to condenser 19, and therein is treated as described above. If desired, an additional gas heater (not shown) may be supplied in valved line 34 to heat the methane stripping medium to a higher temperature than is allowable in extract stripper 8.

Makeup quantities of antimony trichloride to compensate for small losses to raffinate and extract and losses due to decomposition may be admitted to the system through valve 55. Auxiliary valves, bypasses, heat exchangers, pumps, control means and other equipment, the proper placement of which is evident to one skilled in the art, have been omitted for simplicity. Likewise it is possible to substitute equivalent apparatus for apparatus indicated, for example a barometric leg used in conjunction with a gas drier may be used in place of exhauster 29 without departing from the spirit of our invention.

Our invention is further illustrated by the following example:

*Example*

A dewaxed, de-asphaltized Mid-Continent residue is fed to an extraction system at the rate of 48,080 lbs. per hour. This feed is split into two portions; the first, amounting to 12,000 lbs. per hour, is bypassed through the system in the manner subsequently described; the remaining portion amounting to 36,080 lbs. per hour is fed to a countercurrent liquid-liquid extractor maintained at 75° C., wherein it is contacted with antimony trichloride under conditions to produce raffinate and extract phases. The latter phase, amounting to 48,080 lbs. per hour and containing 75% antimony trichloride and 25% extract oil, by weight, is fed to the top tray of a stripping column having 40 trays. Before entering the stripping column the extract is preheated to 125° C. in contact with vapors comprising methane and antimony trichloride withdrawn from the tray below the feed tray.

Methane is supplied to the bottom of the stripper at a rate of 6,200 lbs. per hour. Extract containing less than 0.05% antimony trichloride is withdrawn from the bottom of the extract stripper at a rate of 12,020 lbs. per hour (750 barrels per day). The heat for volatilizing the antimony trichloride is supplied (in addition to preheating) by means of 6 reheaters, arranged along the column in such a manner that liquid antimony trichloride-extract liquid removed from the tray is heated from 100° C. to 125° C., and the resulting heated liquid is re-introduced to the tray below that from which it is withdrawn.

The overhead of the extract stripper, amounting to 42,260 pounds per hour, and containing antimony trichloride and methane, is passed to a condenser and accumulator. The condensed antimony trichloride is recirculated from the accumulator back to the extraction stage. The vapor in equilibrium with the accumulator liquid containing 5.82 mol percent of antimony trichloride (47 wt. percent) is passed to the bottom of a re-absorber column containing 40 trays, at a rate of 11,680 pounds per hour.

The portion of the original oil feed mentioned above which is bypassed is fed to the top of the re-absorber column at a rate of 12,000 pounds per hour to scrub antimony trichloride from the methane. The methane leaving the top of the re-absorber contains only 0.01 wt. percent antimony trichloride and is recirculated to the stripper column. The oil in the re-absorber column removes 99.99% of the antimony trichloride contained in the methane, and is thereafter fed to the countercurrent liquid extractor along with the other portion of the original oil feed. The raffinate phase produced in the liquid phase extractor is treated in a similar manner in a separate system. The efficiency of the system is such that only 412 lbs. of antimony trichloride are lost per day, including losses to the raffinate and extract and decomposition losses.

As already indicated, our process is especially applicable to the treatment of hydrocarbons or mixtures of other organic materials, which treatment results in products substantially inert to antimony trichloride at the temperatures of our process, with antimony trichloride to give rise to the formation of at least one liquid phase which is sufficiently higher boiling than antimony trichloride to enable the latter's vaporization therefrom by stripping with an inert gas. It does not depend upon whether the treatment is carried out in either the liquid or the vapor phase so long as a relatively high boiling liquid results containing antimony trichloride. In other words, our process is applicable to the treatment of lubricating oils, transformer oils, Diesel oils which are treated in the liquid or vapor phase, or hydrocarbon mixtures containing antimony trichloride formed through polymerization or alkylation of hydrocarbons of lower boiling point, to the separation of animal or vegetable oil fractions, phenolic fractions, ethereal oils, etc., because in each case a product will be produced containing inert organic hydrocarbons boiling higher than antimony trichloride, from which the antimony trichloride can be effectively separated by our process. Although the drawing has been described with reference to treatment with substantially pure antimony trichloride, it is not limited thereto but may equally well be applied to treatments with antimony trichloride containing modifying agents, such as selective solvents for aromatic hydrocarbons, e. g., phenols, nitrobenzene, beta-beta-dichlorethyl ether, etc., or other organic or inorganic compounds forming more or less loose complexes with antimony trichloride, such for example as are described in U. S. Patents 2,076,201, 2,085,535, and 2,246,257, including aliphatic alcohols, ketones, ethers, phenols, aluminum chloride, copper chloride, etc. The presence of such modifying substances may have several advantages, one for example being that the liquid phase treatment may be carried out at temperatures below 73° C., the melting point of antimony trichloride. Depending on the boiling temperatures of the modifying agents, portions thereof may follow the same course of flow as the antimony trichloride, in which case the agent will be stripped from the hydrocarbon in the same manner.

Any dry inert normally gaseous substance may be used as a stripping medium, e. g. methane, ethane, propane or butane, methyl chloride, dimethyl ether, nitrogen or natural gas. While we may employ hydrocarbons boiling as high as 10° C. or higher, we prefer to use low boiling substances such as methane or hydrogen because they are generally more economical to separate from the raffinate and extracts produced.

In the foregoing specification and appended claims, by "boiling temperature substantially in excess of the boiling temperature of antimony trichloride" we mean that the substance separated from antimony trichloride should have such a boiling temperature in excess of the boiling temperature of antimony trichloride as to enable economical separation therefrom without requiring excessive heat input, plate requirements and/or reflux ratios. Although in the description no reflux was required or indicated owing to the considerable difference in boiling temperatures of the lubricating oil raffinate or extract and antimony trichloride, our invention is also adapted to separations between components and antimony trichloride which do not have such great differences in boiling temperature as do lubricating oils and antimony trichloride. In these former cases it is usually desirable to apply appropriate quantities of reflux to the top of the strippers.

We claim as our invention:

1. In a process wherein an initial organic substance is treated with antimony trichloride under conditions to form two phases, at least one of which is a liquid phase consisting essentially of antimony trichloride and constituents which are substantially inert to antimony trichloride at the temperatures of the process, and at least a portion of which have boiling temperatures substantially in excess of the boiling temperature of antimony trichloride, the improvement comprising stripping said liquid phase with a normally gaseous medium substantially inert to antimony trichloride under conditions to vaporize antimony trichloride and to produce an overhead vapor containing antimony trichloride and a residue comprising liquid constituents containing a reduced amount of antimony trichloride, separating said residue from said overhead vapor, condensing at least a portion of said antimony trichloride from said overhead vapor, separating said condensed antimony trichloride from residual vapor, contacting said residual vapor with at least a portion of said initial organic substance under conditions to absorb antimony trichloride by said initial substance and to produce a fat organic substance containing antimony trichloride and a lean residual vapor, separating said fat organic substance from said residual vapor and further treating said separated fat substance with antimony trichloride.

2. The process of claim 1 wherein said initial organic substance is a hydrocarbon mixture.

3. The process of claim 1 wherein said organic substance is a hydrocarbon mixture containing aromatic and non-aromatic hydrocarbons.

4. The process of claim 1 wherein said organic substance is extracted with antimony trichloride in the liquid phase.

5. The process of claim 1 wherein said normally gaseous medium has a normal boiling point not greater than 10° C.

6. The process of claim 1 wherein said temperatures do not exceed 170° C.

7. The process of claim 1 wherein substantially all the antimony trichloride is stripped from said liquid phase.

8. In a process for treating an initial hydrocarbon mixture comprising aromatic and non-aromatic hydrocarbons, the steps of extracting said mixture with liquid antimony trichloride under conditions to form raffinate and extract phases, at least one of said phases containing antimony trichloride and constituents having boiling temperatures substantially above the boiling temperature of antimony trichloride, separating said phases, subjecting said phases containing high boiling constituents to stripping with a normally gaseous medium under conditions to cause a substantial portion of the antimony trichloride contained in said phase to pass overhead with said stripping medium and to leave residual hydrocarbons containing a reduced amount of antimony trichloride, condensing at least a portion of antimony trichloride from the resulting overhead vapors, separating the condensed antimony trichloride from residual overhead vapors, contacting the latter with at least a portion of said initial hydrocarbon mixture under conditions to absorb antimony trichloride into said portion and to form a fat portion and residual lean vapors, separating said fat portion from said lean residual vapors and further contacting the fat portion with condensed antimony trichloride.

9. The process of claim 8 wherein said residual lean vapors are recirculated to strip further quantities of said phases.

10. The process of claim 8 wherein substantially all the antimony trichloride contained in said phases is stripped therefrom.

11. The process of claim 8 wherein said normally gaseous medium is a hydrocarbon gas.

12. The process of claim 8 wherein said normally gaseous medium is a gas comprising predominantly methane.

13. The process of claim 8 wherein said stripping is performed at a temperature not exceeding 170° C.

14. The process of claim 8 wherein said extract phase is stripped and wherein the stripping temperature is not permitted to exceed 125° C.

15. The process of claim 8 wherein said raffinate phase is stripped and the stripping temperature is not allowed to exceed 150° C.

ALFRED W. FLEER.
RUSSELL W. MILLAR.